(12) United States Patent
Madore

(10) Patent No.: US 12,239,112 B2
(45) Date of Patent: Mar. 4, 2025

(54) SELF-FILLING AND SELF-CLEANING PET BOWL

(71) Applicant: Austin Madore, Brandon, FL (US)

(72) Inventor: Austin Madore, Brandon, FL (US)

(*) Notice: Subject to any disclaimer, the term of this patent is extended or adjusted under 35 U.S.C. 154(b) by 0 days.

(21) Appl. No.: 18/279,566

(22) PCT Filed: Oct. 7, 2022

(86) PCT No.: PCT/US2022/046101
§ 371 (c)(1),
(2) Date: Aug. 30, 2023

(87) PCT Pub. No.: WO2023/069265
PCT Pub. Date: Apr. 27, 2023

(65) Prior Publication Data
US 2024/0156055 A1 May 16, 2024

Related U.S. Application Data

(60) Provisional application No. 63/257,271, filed on Oct. 19, 2021.

(51) Int. Cl.
*A01K 7/02* (2006.01)

(52) U.S. Cl.
CPC ..................... *A01K 7/02* (2013.01)

(58) Field of Classification Search
CPC . A01K 7/00; A01K 7/02; A01K 7/005; A01K 7/022; A01K 7/025; A01K 7/04; A01K 7/06; A01K 5/00; A01K 5/01; A01K 5/02; A01K 1/0356
See application file for complete search history.

(56) References Cited

U.S. PATENT DOCUMENTS

| | | | |
|---|---|---|---|
| 8,117,991 B1* | 2/2012 | Civitillo | A01K 7/027 |
| | | | 119/72 |
| 8,944,006 B2* | 2/2015 | Anderson | A01K 15/02 |
| | | | 119/51.01 |
| 9,232,769 B1* | 1/2016 | Wolf | B65B 69/0033 |
| D846,815 S * | 4/2019 | Darkwah | D30/132 |
| 11,510,392 B2* | 11/2022 | Sayers | A01K 7/022 |
| 2009/0255477 A1* | 10/2009 | Fournier | A01K 1/01 |
| | | | 119/161 |
| 2011/0174224 A1* | 7/2011 | Brooks | A01K 5/0275 |
| | | | 119/57.92 |
| 2016/0227738 A1* | 8/2016 | Ausman | A01K 5/0142 |
| 2019/0133075 A1* | 5/2019 | Holovin | A01K 5/02 |

* cited by examiner

*Primary Examiner* — Monica L Perry
*Assistant Examiner* — Aaron M Rodziwicz
(74) *Attorney, Agent, or Firm* — William Lovin & Associates LLC; William R. Lovin

(57) ABSTRACT

A pet drinking bowl, particularly a self-filling and self-cleaning pet drinking bowl with a sealing door, a removable drinking bowl, and at least one removable cleaning or filling nozzles aligned around and above the removable drinking bowl, is disclosed. Alternate versions may have removable cleaning or filling nozzles in the sealing lid. The pet drinking bowl is filled by water pressure from a residential water circuit distributed by a series of solenoid valves and is drained via a pump plumbed to the residential drain line. The pump drains the pet drinking bowl by a multi-stage drain with at least two settings: partially open and fully open.

15 Claims, 5 Drawing Sheets

SELF-FILLING AND SELF-CLEANING PET BOWL

CROSS-REFERENCE TO RELATED APPLICATIONS

This application makes reference to U.S. Prov. App. No. 63/257,271 filed 19 Oct. 2021 and incorporates that application, in its entirety, by reference.

FIELD OF THE INVENTION

The invention relates to a pet drinking bowl, particularly a self-filling and self-cleaning pet drinking bowl with a sealing lid, a removable drinking bowl, and at least one removable cleaning and/or filling nozzles aligned around and above the removable drinking bowl. Other versions may have removable cleaning and/or filling nozzles or cartridges in the sealing lid. The pet drinking bowl is filled by means of water pressure from a residential water circuit distributed by means of a series of solenoid valves and is drained via a pump plumbed to the drain line. The pump drains the pet drinking bowl by means of a multi-stage drain with at least two settings: partially open and fully open.

BACKGROUND OF THE INVENTION

The invention relates to a self-filling and self-cleaning pet drinking bowl with a sealing lid, a removable drinking bowl, and at least one removable cleaning and/or filling nozzles aligned around and above the removable drinking bowl. The device may be mounted on a wall or a floor.

In the prior art, self-filling pet bowls are disclosed. Pet bowls with automatically operating lids are disclosed. Pet bowls with drains are disclosed. Pet bowls that operate on line (or reduced line) voltage are disclosed. Pet bowls with filters in the water supply are disclosed.

What is not disclosed is a pet bowl that has the filling and/or cleaning nozzles aligned such that the filling and/or cleaning nozzles can spray the inside of the bowl at an angle to clean the bowl. The filling and/or cleaning nozzles may rotate and be placed at any angle with respect to the bowl.

Also, what is not disclosed is a sealing door (or lid), with an accommodative, flexible seal to prevent water used during the cleaning cycle from being discharged outside the pet drinking bowl when the cleaning cycle is activated and in progress.

Also, what is not disclosed is a multi-level drain operated by a multi-level drain cap that may be positioned with at least two drain openings: 1) Partially open, to soften and soak food that is accidentally deposited in the pet drinking bowl during the cleaning cycle while draining waste cleaning water to the waste line during the cleaning cycle; and, 2) Fully open, for draining cleaning water from the pet drinking bowl to the waste line at the end of the cleaning cycle.

Also, what is not disclosed is a removable, and replaceable, nozzle cartridge, containing a multiplicity of filling and/or cleaning nozzles. The nozzle cartridge is held in place by means of at least one magnet and secured in place by a locking ring around and above the nozzle cartridge. Those having skill in the art will recognize that the nozzle cartridge may be removably snapped into the device. Those having skill in the art will recognize that the nozzle cartridge may be removably snapped on the inside surface of the lid. Those having skill in the art will recognize that the nozzle cartridge may be directly or indirectly connect to an electric motor so that it may rotate.

Also, what is not disclosed is an ultrasonic sensor to detect the level of the water in the pet drinking bowl, a moisture sensor in the rim of the bowl to verify the level of the water in the pet drinking bowl, and/or a computer vision device to measure the level of the water in the pet drinking bowl. Any combination of these three devices may be incorporated into the pet drinking bowl.

SUMMARY OF THE INVENTION

In a first embodiment of the present invention, the pet drinking bowl is constructed with a generally horizontally aligned base which comprises at least: 1) The pet drinking bowl; 2) A removable nozzle cartridge; 3) The drain mechanism, comprising at least: a) A servomotor (or stepper motor); b) A drain device with, in this embodiment, a drain lever operating a drain cap that may be raised to different levels above the base of the pet drinking bowl. Those having skill in the art will recognize that the drain lever may be driven by a cam wheel; c) A drain pump for discharging the water and softened debris from the pet drinking bowl during the cleaning cycle; and, d) An output drain connector connected to the waste sewage circuit in the building. Also, the output drain connector may be modular and affixed with a quick disconnect fitting allowing for rapid connection to the house drain system. Also, a "P-trap" may be included in the drain mechanism before the drain pump.

Behind and generally vertically aligned to the base is a back unit comprising at least: 1) An input water connection. Those having skill in the art will recognize that the input water connection may be modular and affixed with a quick disconnect fitting allowing for rapid connection to the house water supply; 2) A multiplicity of solenoid powered water valves, each plumbed to the input water connection on one side and the removable nozzle cartridge on the output side; 3) A servomotor (or stepper motor) driven door that flips down and covers the opening to the pet drinking bowl. Those having skill in the art will recognize that door may be deployed on track system and may be located inside the back unit and rolled out and in. The door has a foam or plastic seal on its bottom surface that allows it to cover and seal the pet drinking bowl during the cleaning cycle; 4) An ultrasonic sensor placed above the greatest extent of the servomotor (or stepper motor) driven door at the top of the back unit, or, placed above the rim of the bowl. The ultrasonic sensor reads the level of the water in the bowl. Also, a computer vision device may be affixed above the rim of the bowl. This computer vision device optically senses the level of the water in the bowl; 5) An electronic control unit with buttons and an LCD or LED display where the electronic control unit is connected to: a) The solenoid powered water valves; b) The servomotor (or stepper motor) driven door; and, c) The ultrasonic sensor and/or the computer vision device; and, 6) A wi-fi transceiver connected to the electronic control unit.

Affixed in the base above the pet drinking bowl is the removable nozzle cartridge. The removable nozzle cartridge is generally the same shape and presents the same opening as the top edge of the pet drinking bowl. The removable nozzle cartridge has a multiplicity of cleaning and/or filling nozzle connections and cleaning and/or filling nozzles. The cleaning and/or filling nozzle connections are on the outside surface or the bottom side surface of the nozzle cartridge and the cleaning and/or filling nozzles are on the inside surface of the nozzle cartridge. The cleaning and/or filling nozzles are plumbed to or through the removable nozzle cartridge to a cleaning and/or filling nozzle connection. Ordinarily, the removable nozzle cartridge is constructed such that only one or two cleaning and/or filling nozzles are supplied by one cleaning and/or filling nozzle connection. By this means, the system can use a higher water pressure through a minimal number of cleaning and/or filling nozzles while sequencing through cleaning and/or filling nozzle connections. Each cleaning and/or filling nozzle is set at an angle with respect to the inner surface of the pet drinking bowl positioned below it. Generally, the cleaning and/or filling nozzles are pointed down at the same angle, and in the same angular direction, as each other. They are positioned and angled such that they emit water downward into the pet drinking bowl at the same angle to the left or right so that when activated they form a rotating sheet of water in the pet drinking bowl. The rotating sheet of water dislodges debris in, and on, the inner surface of the pet drinking bowl. Those having skill in the art will recognize that the cleaning and/or filling nozzles may themselves rotate or automatically reposition themselves during use using either the pressure of the water that passes through them or a mechanical linkage to an electric motor. For example, one embodiment of the present invention has one rotating nozzle pointed directly down towards the drain to assist in debris evacuation. Various configurations of rotating and angled nozzles may be used to allow for complete cleaning coverage of the drinking bowl.

The cleaning sequence operates according to the following steps: 1) At a predetermined time, the servomotor (or stepper motor) driven door flips down covering the bowl of the pet drinking bowl. Since the servomotor (or stepper motor) driven door is covered in foam or some other plastic sealing material it covers and seals the entirety of the bowl of the pet drinking bowl; 2) The servomotor (or stepper motor) attached to the drain lever operates the drain lever to lift the drain cap to reveal a small drain opening size; 3) The water in the bowl of the pet drinking bowl drains to the discharge line; 4) The electronic control unit sequences the solenoid water valves to perform a cleaning sequence. A cleaning sequence is comprised of less than the total number of cleaning/filling nozzles being fired at the same time to clean the inner surface of the bowl of the pet drinking bowl; 5) The servomotor (or stepper motor) attached to the drain lever operates the drain lever to lift the drain cap to reveal a large drain opening size; 6) The water in the bowl of the pet drinking bowl drains to the discharge line; 7) The servomotor (or stepper motor) attached to the drain lever operates the drain lever to close the drain cap; 8) The electronic control unit sequences the solenoid water valves to perform a filling sequence. A filling sequence is comprised of possibly less than the total number of cleaning/filling nozzles being fired at the same time to fill the bowl of the pet drinking bowl; 9) The servomotor (or stepper motor) driven door flips up uncovering the bowl of the pet drinking bowl.

During the cleaning sequence, the drain lever and drain cap are positioned such that a small opening is formed to the waste circuit. By this means, larger pieces of debris are retained in the pet drinking bowl to soften them and begin dissolution. Also, the drain pump may not operate during the cleaning cycle. Thus, the bowl may drain only by gravity during the cleaning cycle. When the bowl is drained prior to being refilled, a large opening is formed to the waste circuit. By this means, pieces of debris are able to pass through the drain to the waste circuit. At this time the drain pump operates to drain the bowl of the pet drinking bowl.

Periodically, using the ultrasound sensor or the computer vision device, the electronic control unit measures the depth of the water in the bowl of the pet drinking bowl. If the water is below a preset level, the electronic control unit sequences the solenoid water valves to perform a filling sequence. A filling sequence is comprised of possibly less than the total number of cleaning/filling nozzles being fired at the same time to fill the bowl of the pet drinking bowl. Those having skill in the art will recognize that the servomotor (or stepper motor) driven door may be lowered before the filling sequence begins and raised after the filing sequence has been completed.

DETAILED DESCRIPTION OF THE INVENTION

Figure 1:
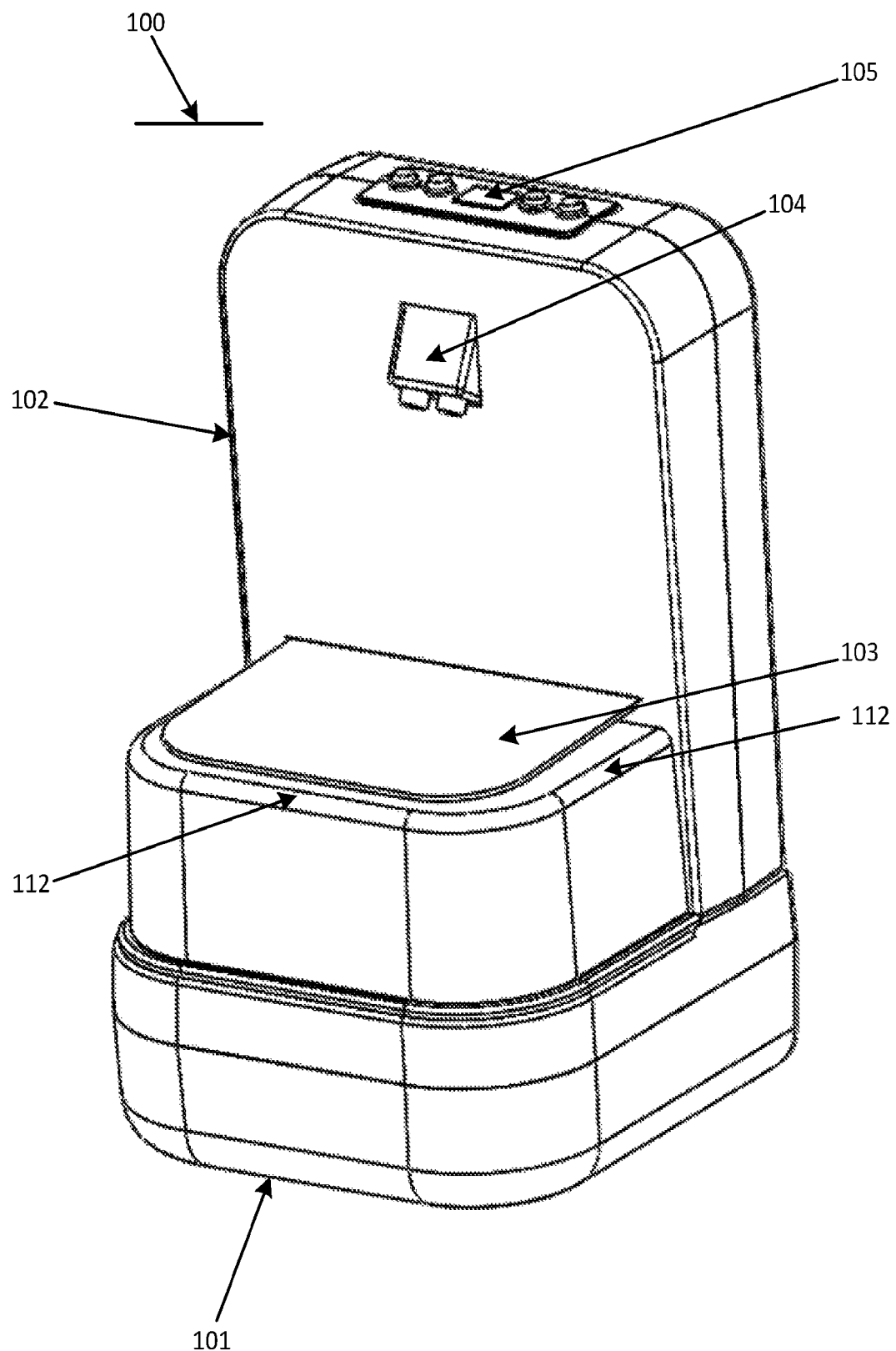
FIG. 1 is an oblique view from the left front of the invention.
Figure 2:
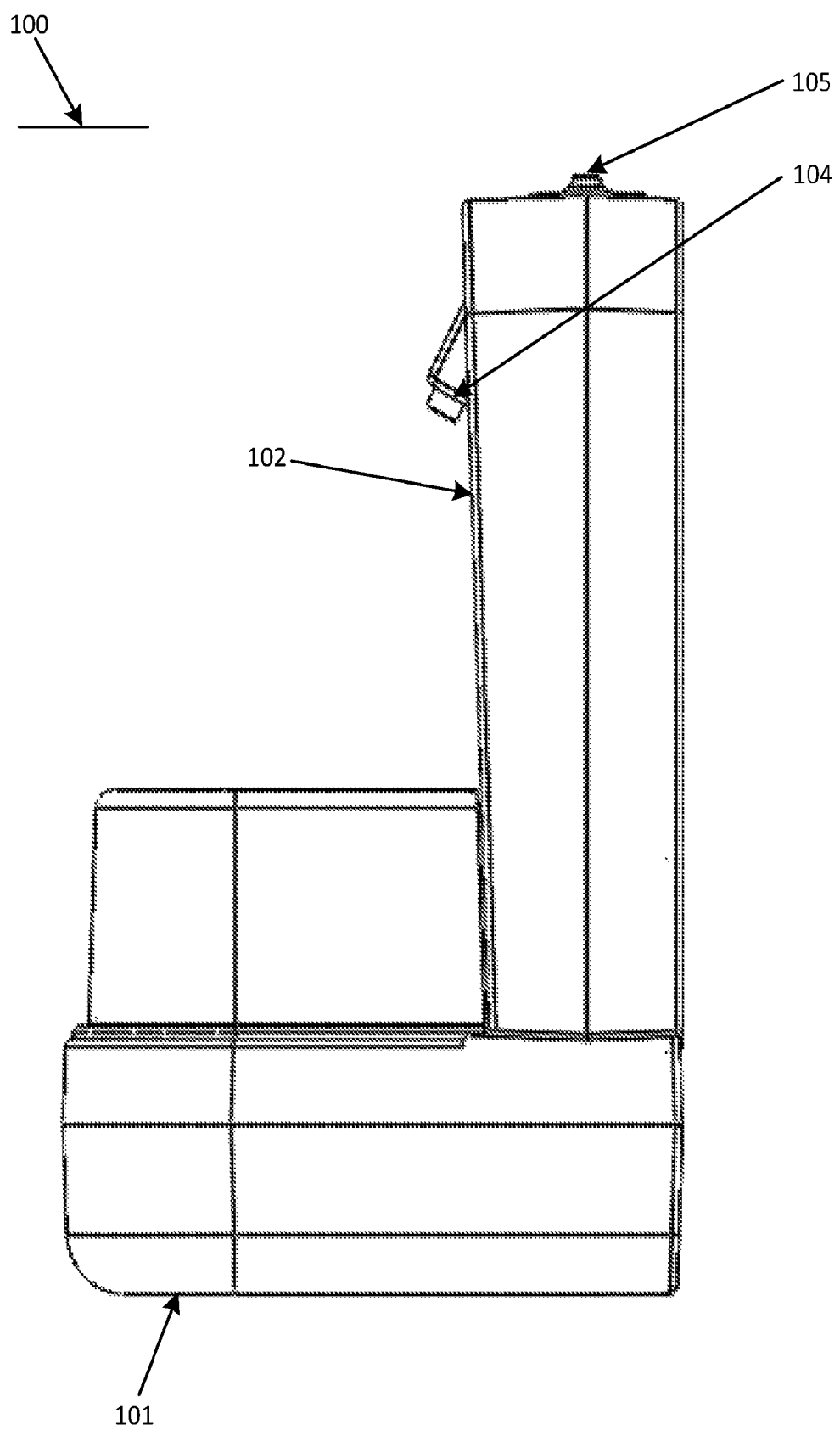
FIG. 2 is a left side elevation of the invention.
Figure 3:
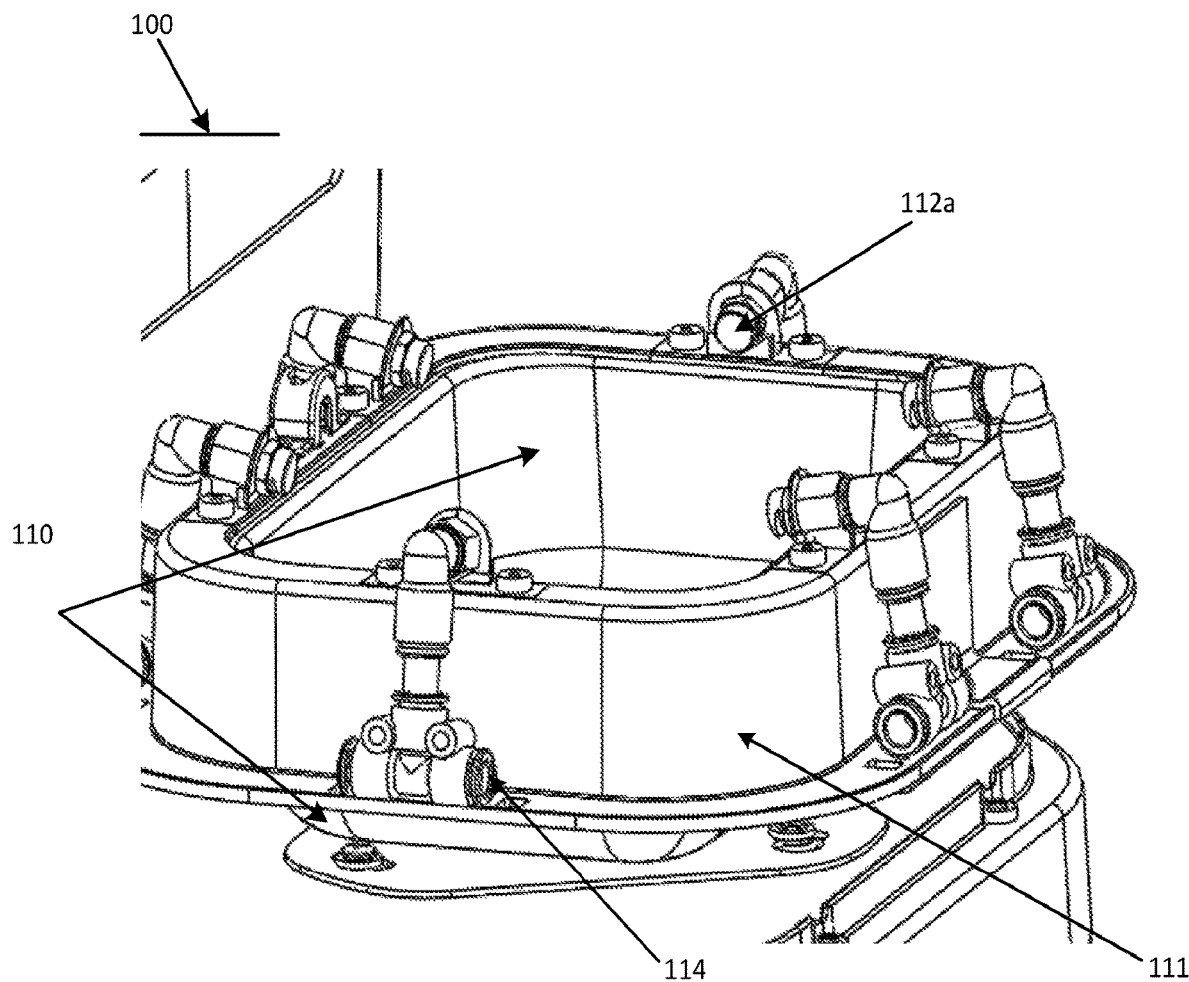
FIG. 3 is a blowup view of the invention that is partially transparent showing the bowl and other inner components.
Figure 4:
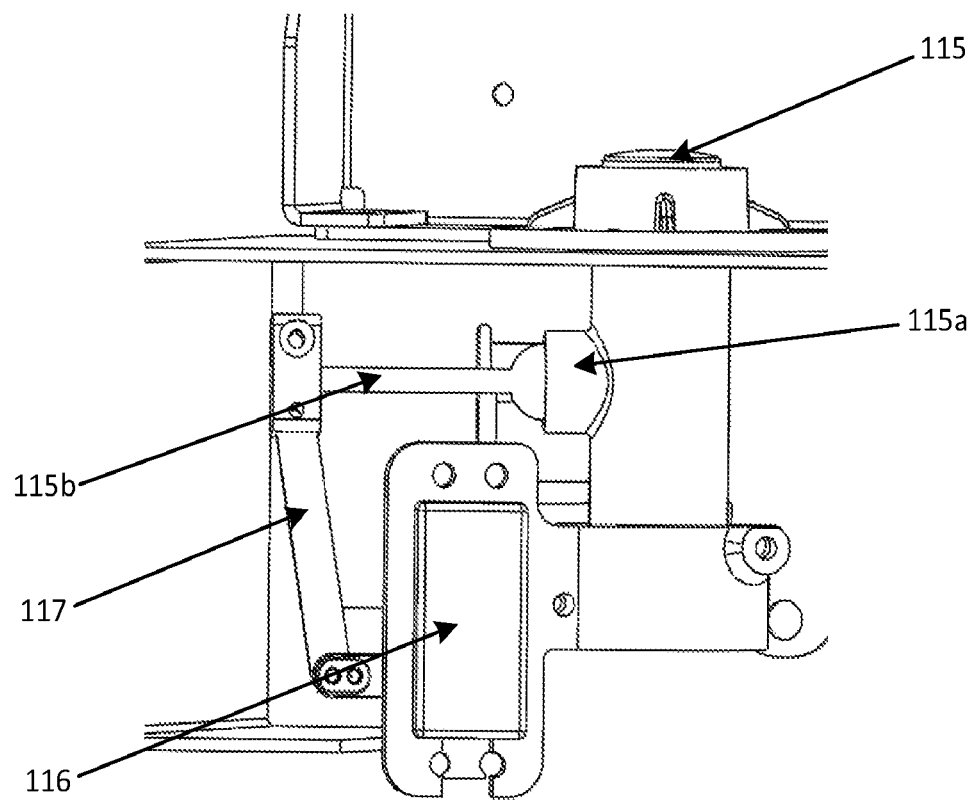
FIG. 4 is an internal view of the invention showing the drain and its actuating components.
Figure 5:
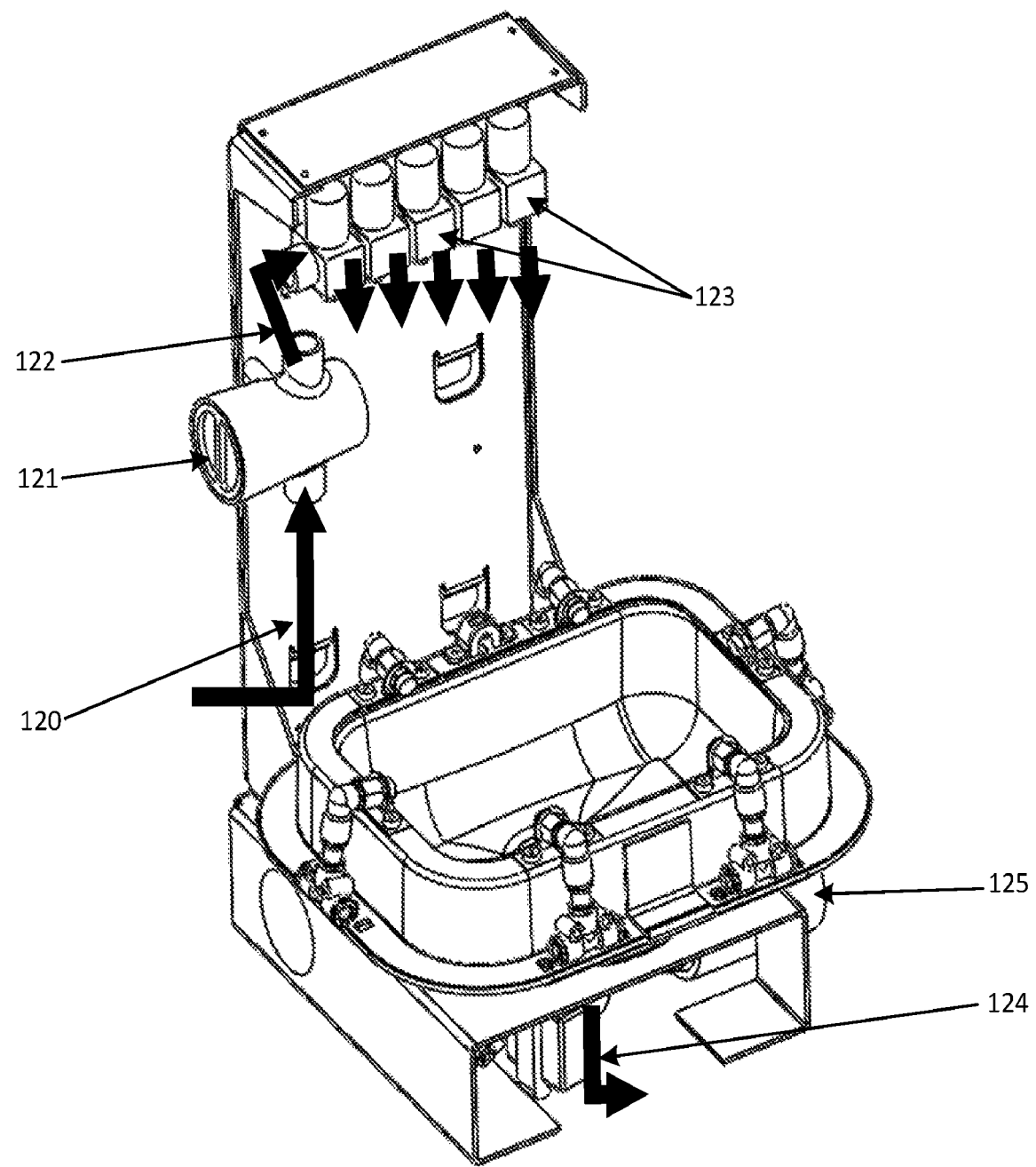
FIG. 5 is an internal view of the invention showing the water input and distribution system and the drain system and drain pump.

Referring now to FIGS. 1 through 5, in a first embodiment of the present invention, the pet drinking bowl 100 is constructed with a generally horizontally aligned base 101 which comprises at least: 1) The bowl 110; 2) A removable nozzle cartridge 111; 3) The drain mechanism, comprising at least: a) A drain servomotor (or stepper motor) 116; b) A drain device with, in this embodiment, a drain lever 115b operating a drain valve 115a which is, in turn, attached to a drain cap 115 that may be raised to different levels above the base of the bowl 110; c) A drain pump 125 for discharging the water and softened debris from the bowl 110 during the cleaning cycle; and, d) An output drain connector connected to the waste sewage circuit in the building. Those having skill in the art will recognize that the output drain connector is modular and affixed with a quick disconnect fitting allowing for rapid connection to the house drain system. Also, a "P-trap" may be included in the drain mechanism before or after the drain pump 125.

Behind and generally vertically aligned to the base is a back unit 102 comprising at least: 1) An input water connection 120. Those having skill in the art will recognize that the input water connection 120 may be modular and affixed with a quick disconnect fitting allowing for rapid connection to the house water supply; 2) A replaceable water filter 121; 3) At least one solenoid powered water valve 123, each plumbed to the output of the replaceable water filter 121 on one side and the removable nozzle cartridge 111 on the output side (five black arrows pointing down in FIG. 5). It will be obvious to those having skill in the art that the multiplicity of solenoid powered water valves 123 may be configured to exist individually or in a group; 4) A servomotor (or stepper motor) driven door 103 that flips down and covers the opening to the bowl 110. The servomotor (or stepper motor) driven door 103 has a foam or plastic seal on its bottom surface that allows it to cover and seal the bowl 110 during the cleaning and filling cycle; 5) An ultrasonic sensor 104 placed above the greatest extent of the rim of bowl 110 at the top of the back unit 102. It will be obvious to those having skill in the art that a computer vision device may be installed above the rim of the bowl 110. The ultrasonic sensor 104 or computer vision device reads the level of the water in the bowl; 6) An electronic control unit 105 with buttons and an LCD or LED display where the electronic control unit 105 is connected to at least: a) The solenoid powered water valves 123; b) The servomotor (or stepper motor) driving the servomotor driven door 103; c) The ultrasonic sensor 104 or computer vision device; and, d) The drain pump 125. Also, a wi-fi transceiver may be connected to the electronic control unit 105. Also, a moisture sensing device may serve as a secondary water level measuring device. The moisture sensing device is mounted in the side of bowl 110 near the top of the water level to be contained in bowl 110. Bowl 110 cleaning sequence is driven primarily by a timed interval. The timed interval is timed and executed by electronic control device 105.

Affixed in the base above the bowl 110 is the removable nozzle cartridge 111. The removable nozzle cartridge 111 is generally the same shape when viewed from above and presents the same opening as the top edge of the bowl 110. The removable nozzle cartridge 111 has a multiplicity of cleaning and/or filling nozzle connections 114 and cleaning and/or filling nozzles 112a. The cleaning and/or filling nozzles 112a are covered on their upper extents by a protective shroud 112. The cleaning and/or filling nozzle connections 114 are on the outside surface or the bottom side surface of the removable nozzle cartridge 111 and the cleaning and/or filling nozzles 112a are on the inside surface of the removable nozzle cartridge 111. The cleaning and/or filling nozzles 112a are plumbed to, though, or over the body of the removable nozzle cartridge 111 to a cleaning and/or filling nozzle connection 114. Ordinarily, the removable nozzle cartridge 111 is constructed such that only one or two cleaning and/or filling nozzles 112a are supplied by one cleaning and/or filling nozzle connection 114. By this means, the system can have a higher water pressure through a minimal number of cleaning and/or filling nozzles 112a while sequencing through cleaning and/or filling nozzle connections 114. Each cleaning and/or filling nozzle 112a is set at an angle with respect to the inner surface of the bowl 110 positioned below it. Generally, the cleaning and/or filling nozzles 112a are pointed down at the same angle, and in the same angular direction, as each other. They are positioned and angled such that they emit water downward into the bowl 110 at the same angle to the left or right so that when activated they form a rotating sheet of water in the bowl 110. The rotating sheet of water dislodges debris in, and on, the inner surface of the bowl 110.

The cleaning sequence operates according to the following steps: 1) At a predetermined time, the servomotor (or stepper motor) driven door 103 flips down covering the bowl 110 of the pet drinking bowl 100. Since the servomotor (or stepper motor) driven door 103 is covered on its bottom surface in foam or some other plastic sealing material it covers and seals the entirety of the removable nozzle cartridge 111 and bowl 110 below it; 2) The drain servomotor (or stepper motor) 116 attached to the drain lever 115b by means of drain link 117 operates the drain lever 115b to operate the drain valve 115a actuating the drain cap 115 to reveal a small drain opening size; 3) The water in the bowl 110 of the pet drinking bowl 100 drains to the discharge line; 4) The electronic control unit 105 sequences the solenoid powered water valves 123 to perform a cleaning sequence. Input water 120 passes through a replaceable water filter 121 and flows into the multiplicity of solenoid powered water valves 123. Also, the pressure of input water 120 may be adjusted by a fill water pump. Also, a pressure regulator may be attached to the source of input water 120. A cleaning sequence is comprised of less than the total number of solenoid powered water valves 123 being fired where each of the solenoid powered water valves 123 are plumbed to at least one cleaning and/or filling nozzle 112a. By this means fewer than all of the cleaning and/or filling nozzles 112a are fired at the same time to clean the inner surface of the bowl 110 of the pet drinking bowl 100; 5) The drain servomotor (or stepper motor) 116 attached to the drain lever 115b by means of drain link 117 operates the drain lever 115b to lift the drain cap 115 to reveal a large drain opening size; 6) The bowl 110 of pet drinking bowl 100 drains to the discharge line; 7) The drain servomotor (or stepper motor) 116 attached to the drain lever 115b by means of drain link 117 operates the drain lever 115b to close the drain valve 115a and drain cap 115; 8) The electronic control unit 105 sequences the solenoid powered water valves 123 to perform a filling sequence. A filling sequence is comprised of possibly less than the total number of cleaning and/or filling nozzles 112a being fired at the same time to fill the bowl 110 of the pet drinking bowl 100; 9) The servomotor (or stepper motor) driven door 103 flips up uncovering the bowl 110 of the pet drinking bowl 100.

During the cleaning sequence, the drain lever 115b, drain valve 115a, and drain cap 115 are positioned such that a small opening is formed to the waste circuit. By this means, larger pieces of debris are retained in the bowl 110 to soften them and begin dissolution. Also, the drain pump 125 may not operate during the cleaning cycle. Thus, the bowl 110 may drain only by gravity during the cleaning cycle. When the bowl 110 is drained prior to being refilled, the drain servomotor 116 attached to the drain lever 115b by means of drain link 117 operates the drain lever 115b to open the drain valve 115a and lift the drain cap 115 to reveal a large drain opening size. By this means, pieces of debris are able to pass through the drain cap 115 and drain valve 115a to the waste circuit. At this time the drain pump 125 operates to drain the bowl 110 of the pet drinking bowl 100.

Periodically, using the ultrasonic sensor 104 or the computer vision device, the electronic control unit 105 measures the depth of the water in the bowl 110 of the pet drinking bowl 100. If the water is below a preset level, the electronic control unit 105 sequences the solenoid powered water valves 123 to perform a filling sequence. A filling sequence is comprised of possibly less than the total number of cleaning and/or filling nozzles 112a being fired at the same time to fill the bowl 110 of the pet drinking bowl 100. The filling sequence is terminated when the ultrasonic sensor 104 or the computer vision device determines that the water depth in bowl 110 has been restored to an appropriate level. At this time, the ultrasonic sensor 104 or the computer vision device sends a signal to the electronic control unit 105 which in turn sends a signal to the solenoid powered water valves 123 disabling them. Those having skill in the art will recognize that the servomotor (or stepper motor) driven door 103 may be lowered before the filling sequence begins and raised after the filing sequence has been completed.

A wi-fi transceiver is also included in the pet drinking bowl 100. The wi-fi transceiver is electrically connected to the electronic control unit 105 which is in turn connected to the drain servomotor (or stepper motor) 116, the drain pump 125, the ultrasonic sensor 104 or computer vision device, the solenoid powered water valves 123, and the door 103 servomotor (or stepper motor). The wi-fi transceiver may cause the electronic control unit 105 to undertake any operation by means of remote control. Also, a replaceable water filter 121 may be equipped in the input water line. Also, the pressure of input water 120 may be adjusted by an optional fill water pump. Also, a pressure regulator may be attached to the source of input water 120.

What is claimed is:

1. A self-filling and self-cleaning pet bowl comprising:
   a) a bowl;
   b) a servomotor or stepper motor controlled door with a water-resistant seal located on a lower half of the servomotor or stepper motor controlled door arranged above the bowl so that when the servomotor or stepper motor controlled door is closed on the bowl the bowl is sealed so that no fluid present in the bowl exits the bowl;
   c) at least two cleaning or filling nozzles arranged above the bowl;
   d) a drain servomotor or stepper motor controlled drain valve and drain cap located at a lowest point of the bowl plumbed to a drain system;
   e) an ultrasound sensor or a computer vision device arranged to sense a level of water in the bowl;
   f) at least one solenoid powered water valve arranged to receive tap water from a water supply system, delivered through a water filter, on an input side plumbed to at least one of the cleaning or filling nozzles on an output side;
   g) an electronic control unit comprising a microprocessor wherein the microprocessor receives input from the ultrasound sensor or the computer vision device and controls the servomotor or stepper motor controlled door, the drain servomotor or stepper motor controlled drain valve and drain cap, the at least one solenoid powered water valves, and a drain pump; and
   h) a wi-fi transceiver connected to the electronic control unit.

2. The self-filling and self-cleaning pet bowl of claim 1, in which the cleaning filling nozzle is supplied in a removable nozzle cartridge.

3. The self-filling and self-cleaning pet bowl of claim 1, wherein the water filter is connected to the water supply system by means of a modular, quick disconnect fitting.

4. The self-filling and self-cleaning pet bowl of claim 1, in which an interconnection between the drain pump and the drain system is modular and affixed with a quick disconnect fitting.

5. The self-filling and self-cleaning pet bowl of claim 1, in which a "P-trap" is included in a drain mechanism before the drain pump.

6. The self-filling and self-cleaning pet bowl of claim 1, in which a "P-trap" is included in any drain mechanism installed after the drain pump.

7. The self-filling and self-cleaning pet bowl of claim 1, in which each of the at least two cleaning filling nozzles are arranged so that each discharges fluid at an angle between 0° and 90° from a horizontal axis of the bowl.

8. The self-filling and self-cleaning pet bowl of claim 1, wherein a multiplicity of solenoid powered water valves are plumbed to supply fluid to a different cleaning filling nozzle.

9. The self-filling and self-cleaning pet bowl of claim 1, wherein the drain servomotor for stepper motor controlled drain valve and drain cap is positioned to be partially open.

10. The self-filling and self-cleaning pet bowl of claim 1, wherein the drain servomotor or stepper motor controlled drain valve and drain cap is positioned to be fully open.

11. The self-filling and self-cleaning pet bowl of claim 1, that is configured to drain the bowl by means of a partially open drain valve and drain cap and then subsequently drain the bowl by means of a fully open drain valve and drain cap.

12. The self-filling and self-cleaning pet bowl of claim 1, wherein a fill water pump is installed between the water supply system and the at least one solenoid powered water valve.

13. A self-filling and self-cleaning pet bowl comprising:
    a) a bowl;
    b) a servomotor or stepper motor controlled door with a water-resistant seal on a bottom of the servomotor or stepper motor controlled door arranged above the bowl so that when the servomotor or stepper motor controlled door is closed on the bowl the bowl is sealed so that no fluid present in the bowl exits the bowl;
    c) at least one cleaning filling nozzle arranged above the bowl;
    d) a drain servomotor for stepper motor controlled drain valve and drain cap located at a lowest point of the bowl plumbed to a drain system;
    e) an ultrasound sensor or a computer vision device arranged to sense a level of water in the bowl;
    f) at least one solenoid powered water valve arranged to receive tap water from a water supply system on an input side plumbed to the at least one of the cleaning filling nozzles on an output side;
    g) an electronic control unit comprising a microprocessor wherein the microprocessor receives input from the ultrasound sensor or the computer vision device and controls the servomotor for stepper motor controlled door, the drain servomotor for stepper motor controlled drain valve and drain cap, the at least one solenoid powered water valves, and a drain pump; and
    h) a wi-fi transceiver connected to the electronic control unit.

14. The self-filling and self-cleaning pet bowl of claim 13, wherein tap water is delivered through a water filter.

15. The self-filling and self-cleaning pet bowl of claim 14, wherein the water filter is changeable by a user.

* * * * *